April 23, 1963

D. P. ROHRER ET AL 3,086,459

CARD PRINTING MACHINE

Filed May 26, 1959

INVENTORS
DOUGLAS P. ROHRER
GEORGE A. WOOD, JR.
BY
Kenway, Jenney, Witter & Hildreth
ATTORNEYS

INVENTORS
DOUGLAS P. ROHRER
GEORGE A. WOOD, JR.

ATTORNEYS

April 23, 1963  D. P. ROHRER ET AL  3,086,459
CARD PRINTING MACHINE

Filed May 26, 1959                              3 Sheets-Sheet 3

INVENTORS
DOUGLAS P. ROHRER
GEORGE A. WOOD, JR.
BY
Kenway, Jenney, Witter & Hildreth
ATTORNEYS 3,086,459
CARD PRINTING MACHINE
Douglas P. Rohrer, Lexington, and George A. Wood, Jr., South Lincoln, Mass., assignors to Arthur D. Little, Inc., Cambridge, Mass., a corporation of Massachusetts
Filed May 26, 1959, Ser. No. 815,941
9 Claims. (Cl. 101—297)

This invention relates to printing or stamping machines and, more particulary, is an improvement upon certain portions of card printing machines of the general type disclosed in Letters Patent No. 2,283,804, issued May 19, 1942, in the name of C. Grant et al., and which are particularly adapted for use in libraries and similar establishments where it is desired to record the borrowing of books and the like.

In the use of card printing machines of the general type disclosed in the aforementioned patent, a type carrier or card having indicia identifying a particular borrower is inserted into the machine. A separate record card is then inserted into the machine in registry with the type card and, as in the machine of the aforementioned patent, suitable control means are actuated by the record card, during its insertion into the machine, to automatically actuate a stamping mechanism to reproduce the borrower's identifying indicia on the record card. It is also usual to provide in such machines date stamping means which are actuated simultaneously with the identifying indicia stamping means so as to record selected dates on the record card corresponding to the borrowing date or return date of the article borrowed.

In order to accomplish the recording of a plurality of transactions on the same record card, it is necessary to provide means for locating the card in the machine relative to the type carrier and date stamper in a different portion each time a printing is made so that there will be no overlapping of successive printings. In the machine of the aforementioned patent, a portion of a longitudinal edge of the record card is cut away simultaneously with each printing operation to permit the record card to be inserted into the machine a greater distance on each successive use of the card and thus automatically provide spacing of successive printings on the card. More specifically, the edge notching of the card provides a shoulder on the card extending generally parallel to one end of the card and spaced along the card from said one end thereof. The shoulder on the card is engageable with punch actuating means in the machine, during insertion of the card, so as to arrest movement of the card into the machine and then upon further inward movement of the card to simultaneously actuate the punch to cut out another portion of the card and actuate the stamping means to print the identifying indicia and date on the card.

While machines of the type described have proved generally satisfactory, it has been found that unless extreme care is taken by the operator, during insertion of the record card, the card may be canted in the machine. While the machine may still be operated by the card in the canted position, the identifying indicia and date will be inclined relative to adjacent printings and thus in some instances cause overlapping of the printing and generally will provide an undesirable appearance to the card.

Accordingly, it is the primary object of this invention to provide, in a card printing machine of the type described, novel and improved card actuated means for actuating the stamping means of the machine which will assure accurate aligning of the card in the machine prior to actuation of the printing means so that successive printings on the record card will be made in an orderly and regularly spaced manner.

It is another object of this invention to provide in a machine of the type described novel and improved card actuated means for effecting operation of the punching and printing portions of the machine which is of more simple and economical construction than previously provided while at the same time providing extended trouble-free service.

It is a further object of this invention to provide in a machine of the type described novel and improved means for rendering the stamping means inoperative following a printing operation and until a significant manipulation of the card is effected, thus precluding unintentional successive operations of the machine.

The novel features of this invention will be apparent from a consideration of the following description taken in connection with the accompanying drawings, in which.

Figure 1:
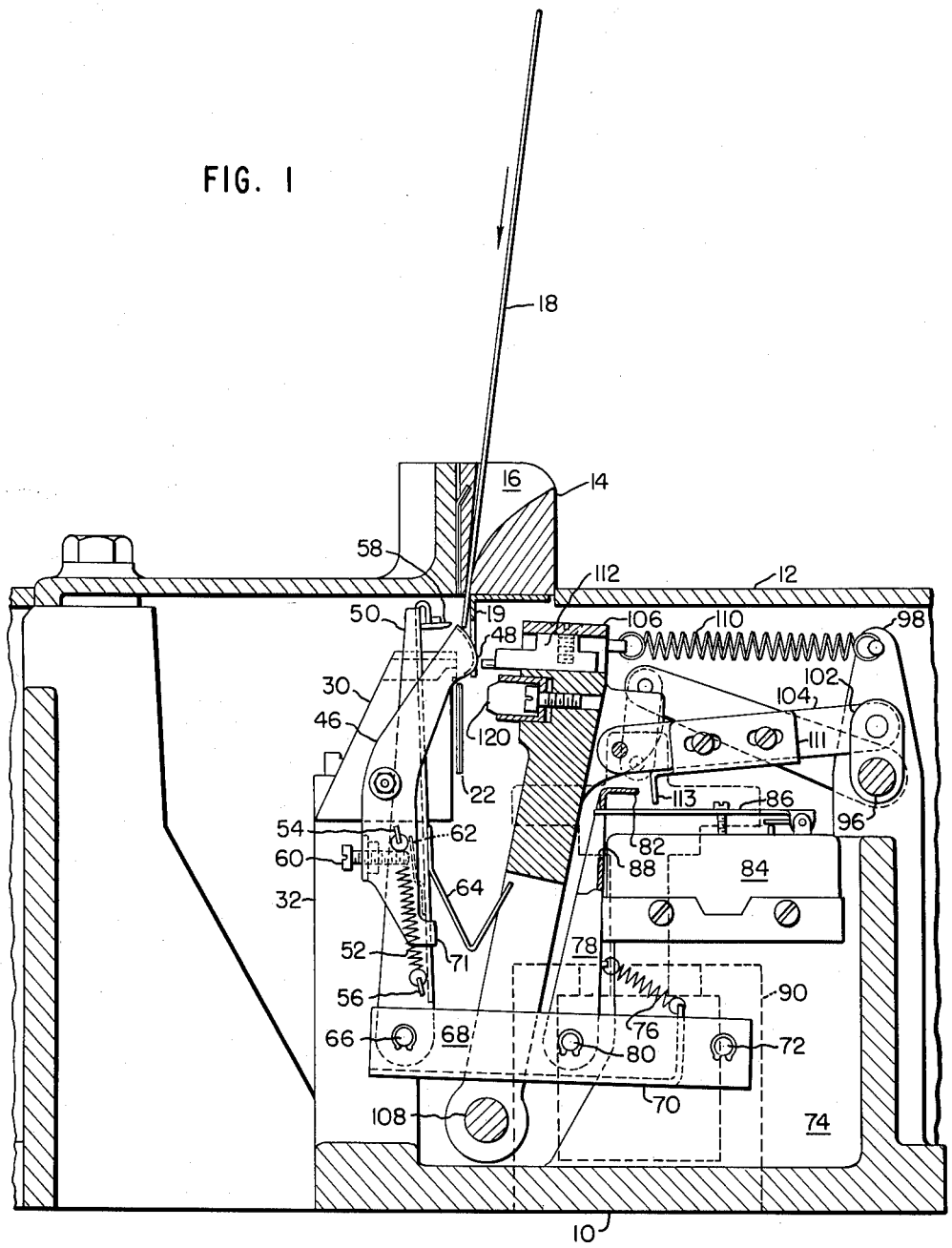
FIG. 1 is a fragmentary longitudinal cross sectional view of a card printing machine incorporating the present invention with portions of the machine omitted.
Figure 2:
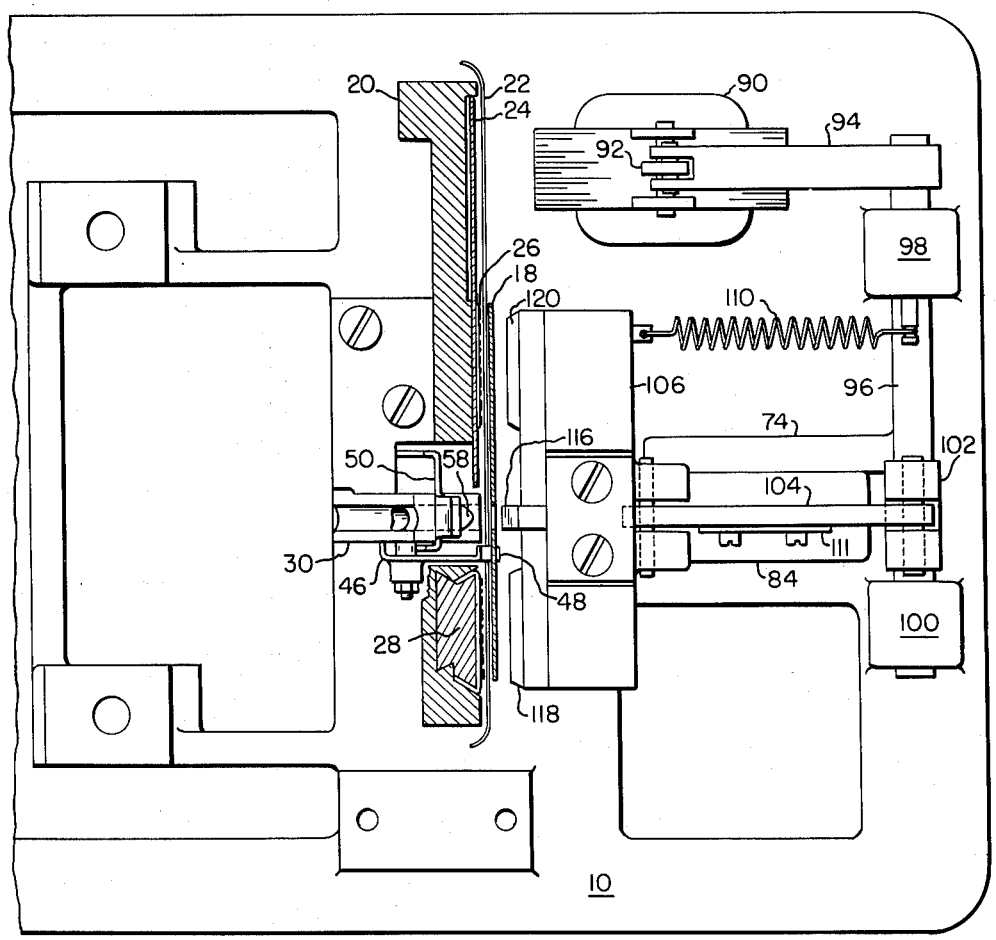
FIG. 2 is a fragmentary plan view, partly in section, of the machine of FIG. 1, with the outer casing removed and with certain parts omitted.

With reference to the drawings and particularly FIGS. 1 and 2, a card printing machine of a type with which this invention is concerned generally comprises a base 10 and an enclosing housing or casing 12. The casing is provided with an aperture in the top thereof in which is received a removable top or ribbon carrier 14 which supports a pair of spools (not shown) for carrying inking ribbon (not shown) used in the printing operation of the machine. The construction and arrangement of the ribbon spools and also the means for advancing the ribbon during operation of the machine are not necessary for a complete understanding of this invention and thus have been omitted in the interest of brevity. The structural details and operation of these structures may be found by reference to the aforementioned Patent No. 2,283,804. The cover 14 is provided with a slot 16 for the insertion of a record card 18 into the machine wherein the card will be located between a guide wall or flange 19 depending from the cover and a vertical wall 20, best shown in FIG. 2, which also depends from the cover 14. When inserted in the machine, the card 18 will lie generally parallel to the flange 19 which in effect provides an extension of the slot 16 so that the portion of the card inserted into the machine may be said to lie in the general plane of the slot 16 with this general plane being defined by the surface of the flange 19 facing the card. The cover also carries a ribbon guide 22 which guides the inking ribbon generally laterally of the vertical wall 20 and the record card 18, the guide 22 being disposed between the card 18 and the wall 20. With particular reference to FIG. 2, the vertical wall 20 is provided with a recess in the surface thereof facing the rightward end of the machine as viewed in FIG. 2. This recess is dimensioned to accommodate a type card or type carrier 24 which carries embossed indicia 26 for identifying the borrower or furnishing other pertinent information. A suitable slot (not shown) is provided in the cover 14 for the insertion of the type carrier 24 into the recess in the vertical wall 20 and between the wall and the ribbon guide 22. Reference may be made to the aforementioned patent for additional details with respect to the type card and machine structure associated therewith.

With particular reference to FIG. 2, a date bar 28 is slidably mounted in the vertical wall 20 for vertical movement in opposite directions and carries a plurality of replaceable type bars for indicating specific preselected dates. The date bar projects upwardly through the cover 14 and is selectively movable to position the desired date indicia in predetermined position by means of a suitable manually operated mechanism, such as a rack and gear. The specific details of the date bar and the associated structure for moving the same may be had by reference to the aforementioned patent and are here omitted in the interest of brevity.

Figure 4:
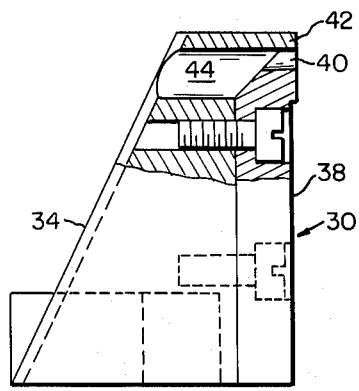
FIG. 4 is an enlarged side elevational view, partly in section, of the punching die of the machine of FIG. 1.
Figure 5:
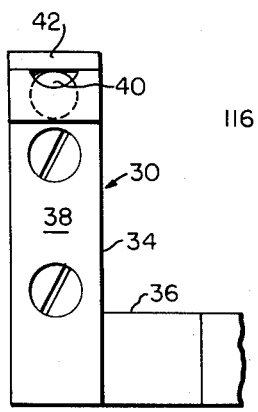
FIG. 5 is an end view of the die of FIG. 4.

As shown in FIGS. 1 and 2, a punching die 30 is supported adjacent the top of the casing 12 and in registry with the aperture closed by the cover 14 by means of a vertical post 32 integral with the base 10. The die 30 is shown in detail in FIGS. 4 and 5 as comprising a main body portion 34 having a right-angled projection 36 extending from the bottom thereof which is secured to the top of the post 32. An anvil plate 38 is secured to the front of the body 34 and is provided at its upper edge with a segmentally shaped recess or notch 40 co-operating with an overhanging lip 42 on the body 34 to provide a segmental opening in which is receivable a correspondingly shaped punch to be further described hereinafter. The body 34 is provided with an enlarged opening or passage 44 communicating at one end with the segmental opening 40 and at its other end with a groove along the inclined rear edge of the die body 34 for the ejection of portions of a card punched out in a manner hereinafter apparent.

Figure 3:
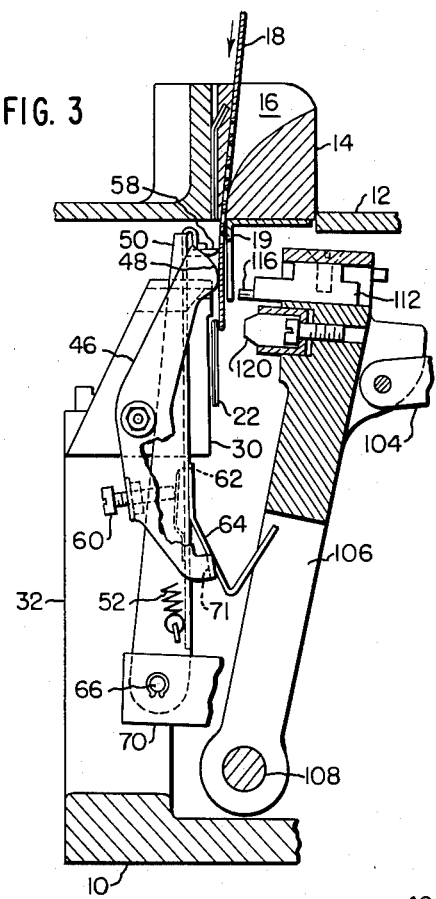
FIG. 3 is a side elevational view, partly in section, of the card locating, punching and printing elements of the machine of FIG. 1.
Figure 8:
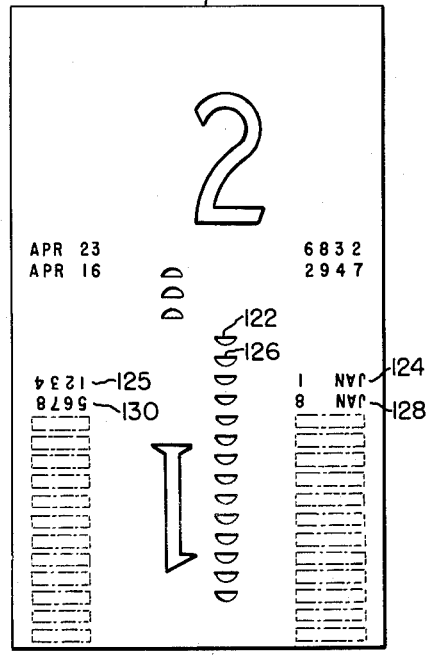
FIG. 8 is a plan view of an exemplary record card for use with the machine of FIG. 1.
Figure 7:
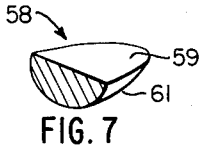
FIG. 7 is an enlarged fragmentary perspective view of a portion of the mechanism of FIG. 3.

With reference to FIGS. 1 to 3, a feeler arm 46 is mounted intermediate its ends on a fixed pivot on one side of the die 30. The upper end of the arm 46 is provided with a rounded cam surface 48, which, as shown in FIGS. 1 and 3, is engageable with the cord 18 during insertion of the card vertically downwardly into the machine so as to rock the lever 46 in a counterclockwise direction as viewed in FIGS. 1 and 3. Disposed between the feeler arm 46 and the die 30 is one leg of a generally U-shaped sensing arm or lever 50, the other leg of which is, as shown in FIG. 2, disposed on the opposite side of the die 30. The feeler lever 46 and sensing lever 50 are, as shown in FIG. 1, connected by a tension coil spring 52 having its ends attached to hooks 54 and 56 on the feeler lever and sensing lever respectively. The sensing lever carries at its upper end a finger 58 which, as shown in FIG. 7, has a cross section generally corresponding to the cross section of the die opening 40 but of a lesser height. The sensing finger 58 is engageable in a previously punched opening in a record card, of a type such as shown in FIG. 8, as the card is inserted into the machine so as to accurately position the card in the machine and also to form a driving engagement with the card so that upon subsequent additional movement of the card downwardly, or in the direction of card inserting movement into the machine, the lever 50 will be carried with the card. The finger 58 is preferably tapered in a horizontal plane to facilitate insertion of the finger in a card aperture. However, in order to provide a good driving connection between the finger and card, it is preferred that the top surface 59 of the finger not be inclined. It is further preferred that the bottom 61 of the finger be inclined so as to provide a camming action which upon lifting of the card for withdrawal will tend to move the finger 58 away from the card.

As shown in FIGS. 1 and 3, the feeler lever 46 and sensing lever 50 are resiliently drivingly connected by means of a screw 60, adjustably carried by the feeler arm below its pivot with one end of the screw being engageable with a leaf spring 62 carried by the sensing arm 50. The sensing arm 50 also carries a trough-like element or card stop 54 having a generally V-shaped cross section and facing vertically upwardly in registry with the card receiving slot 16 in the cover 14.

The lower end of the sensing lever 50 is connected to a pivot 66 at one end of the side wall 68 of a channel-shaped lever 70 which is pivotally connected at its other end at 72 to a vertical web or wall 74 integral with the base 10. As will be apparent from FIG. 1, the pivots for the feeler lever 46 and sensing lever 50 are located relative to the ends of the spring 52 such that the spring tends to urge the lever 46 in a clockwise direction while tending to urge the lever 50 in the opposite direction. A stop 71 on the lever 46 is engageable with the lever 50 to limit this opposite movement of the levers 46 and 50. This operational relationship between the feeler lever 46 and sensing lever 50 further assures that the sensing finger 58 will normally be spaced from the general plane of the slot 16 so as not to interfere with the insertion of the card into the machine until the lower edge of the card has passed the sensing finger 58 and the card has engaged the feeler arm 46 to pivot the same in a counterclockwise direction.

The bottom wall of the arm 70 is turned up at the end adjacent the pivot 72 to provide an anchor for one end of a tension spring 76 connected at its other end to a switch actuating lever 78. As shown in FIG. 1, the spring 76 is connected intermediate the ends of the lever 78, which has its lower end pivotally connected at 80 to the side wall of the lever 70 and intermediate the pivots 66 and 72. The lever 78 extends upwardly from the lever 70 and is provided at its upper end with a turned-over lip 82. Mounted on the wall 74 adjacent the lever 78 is a control switch 84 having a spring biased pivoted switch actuating arm 86 extending generally horizontally and toward the actuating lever 78. The lever 78 is provided with an aperture 88 in which the free end of the switch actuating arm 86 is receivable, with the upper bordering edge portion of the opening 80 forming a shoulder bearing on the top of the arm 86.

The switch 84 is electrically connected by suitable means (not shown) to a solenoid 90, which, as shown in FIGS. 1 and 2) has a vertically movable armature connected by link 92 to one end of a rocker arm 94 connected at its other end to a rock shaft 96 oscillatably mounted to a pair of pillars or posts 98, 100 integral with the base 10. A second rocker arm 102 intermediate the ends of the shaft 96 is pivotally connected to one end of a link 104 pivotally connected at its other end to the upper end of a generally vertically extending punch lever 106, the lower end of which is, as shown in FIGS. 1 and 3, pivotally mounted at 108 to suitable means (not shown) on the base 10.

As will be apparent from FIG. 1, downward movement of the armature of the solenoid 90 will result in movement of the punch lever 106 in a counterclockwise direction, as viewed in FIG. 1, and toward the die 30. A tension coil spring 110 is connected between the upper end of the punch lever 106 and post 98 to urge the lever 106 in a clockwise direction or away from the die 30. A solenoid deenergizing element 111 having an L-shaped cross section is adjustably mounted on the link 104 for movement therewith and for adjustment relative to the link longitudinally thereof. The element 111 has a depending flange or shoulder 113 which is engageable with the lip 82 on the switch actuating lever 78 in response to movement of the link 104 toward the die 30 so as to pivot the lever 78 in a counterclockwise direction, as viewed in FIG. 1, and disengage the upper bordering edge portion of the aperture 88 in the lever 78 from the free end of the switch actuating arm 86.

Figure 6:
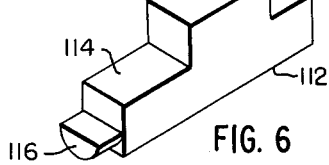
FIG. 6 is an enlarged perspective view of the punch of the machine of FIG. 1.

The lever 106 carries at its upper end a punch 112 shown in detail in FIG. 6 as comprising a body 114 which is receivable in a recess in the upper end of the lever 106 and is secured to the lever by suitable means, such as a screw extending thereinto. A projection 116 extends from the body 114 and provides the punching element which is receivable in the die opening 40 and which has a cross section complementary to the die opening 40. As will be apparent from FIGS. 1 and 2, the punching element 116 is disposed between and spaced from the side bordering edge portions of the slot 16 so as to locate the punched apertures in the card in spaced relation to the side edges of the card. Further, the punch element and sensing finger 58 are aligned laterally of the slot 16 with the punch being spaced from the finger 58 in the direction of card inserting movement into the machine. Further as shown in FIGS. 1 to 3, the punch lever 106 also carries adjacent its upper end a pair of platens 118, 120, respectively registering with the type on the type card 26 and date bar 28.

In the use of a card punching machine of the class described and incorporating the present invention, the borrower's identifying type-carrying card 34 is inserted into the machine, and the date bar 28 is adjusted to register the appropriate date type with the platen 118. The record card 18 is then inserted into the machine through the slot 16 and moved downwardly into engagement with the cam surface 48 of the feeler arm 46 to cam member 46 in a counterclockwise direction, as viewed in FIG. 3. This movement of the arm 56 will, through the resilient drive between the feeler arm 46 and sensing lever 50, pivot the lever 50 in a clockwise direction, as viewed in FIG. 3, from its inoperative position, wherein the finger 58 is spaced from the general plane of the card-receiving slot 16, as shown in FIG. 1, toward its card-engageable position, shown in FIG. 3.

In the case where there have been no locating holes previously punched in the card or at least in the portion thereof presently being used, the card will be permitted to pass into the machine until its lower edge or leading end bottoms in the card stop 64. Subsequent downward movement of the card will carry the sensing lever 50 downwardly against the force of the coil spring 52 so as to pivot the level 70 in a counterclockwise direction as viewed in FIG. 1 and draw the switch actuating lever 86 downwardly. The free end of the switch actuating arm 86, being engaged with the upper bordering edge portion of the aperture 88 in the lever 78, will accordingly be depressed to actuate the switch 84 to energize the solenoid 90 and effect movement of the punch lever 106 in a counterclockwise direction, as viewed in FIG. 1, so as to punch the initial aperture shown at 122 in FIG. 8.

At the same time, the platens 118, 120 will be engaged with the card to press the card, ribbon and type on the card 26 and date bar 28 into engagement so as to print the information such as at 124, 125 on the card. As the link 104 is moving to the left, as viewed in FIG. 1, following energizing of the solenoid 90, the shoulder 113 of the solenoid deenergizing element 111 will engage the lip 82 of the lever 78 to pivot the lever 78 in a counterclockwise direction to disengage the switch actuating arm 86 and permit the same to spring upwardly to deenergize the solenoid 90. While the deenergizing of the solenoid 90 will normally take place prior to the completion of the punching or stamping operation, the inertia of the moving elements of the system is sufficient to complete the operations.

It will be apparent that as long as the sensing lever 50 is depressed by the card 18, the switch 84 will remain in a solenoid deenergizing condition with the end of the switch actuation arm 86 disengaged from the upper edge portion of the aperture 88 in the lever 78. It will be further apparent that a significant amount of upward movement of the sensing lever 50 is necessary in order to provide sufficient relative movement between the levers 78 and 86 for the end of the arm 86 to be re-engaged in the aperture 88. In this manner, inadvertent double stamping of the card is effectively prevented, it being required that a significant upward movement of the card 18 be accomplished in order to release the interlock feature provided by the levers 78 and 86 so as to permit reenergization of the solenoid in response to subsequent intentional downward movement of the sensing arm 50.

When a subsequent recording is to be made on the card 18, the card is again inserted in the machine in the same manner as previously described to engage the feeler lever 46 to pivot the same with the attendant pivoting of the sensing lever 50 into card engagement. In this instance, however, the card will not be permitted to move sufficiently downward to bottom in the card stop 64. Rather, the sensing finger 58 will be seated in the previously punched aperture 122 as the card is being inserted to limit movement of the same inwardly of the machine. The full seating of the finger in the card aperture will accurately align the card in the machine, with the upper flat surface 59 of the finger being drivingly engaged with the upper flat bordering edge portion of the aperture. Accordingly, subsequent downward movement of the card 18 will carry the lever 50 with it so as to actuate the punching and stamping means in the same manner as previously described. At this time, a second aperture 126 will be punched in the card immediately below and vertically aligned with the previously formed aperture 122 and pertinent data such as at 128 and 130 will be printed on the card. Successive uses of the card will provide the remaining locating holes and pertinent printing as shown in FIG. 8. The specific configuration of the card aperture may be other than that specifically shown as long as it provides both a suitable upper edge portion for driving engagement with the correspondingly shaped top surface of the finger 58 and also as long as it is in cooperation with the card aperture, suitable to provide accurate alignment of the card. In the specific embodiment shown, the seating of the finger in the portions of the aperture formed by the juncture of the top flat edge thereof with the curved bottom edge effectively precludes inadvertent canting of the card in the machine. Thus, it will be obvious that the canting problems have been effectively solved by this invention, while at the same time the irregular contours, resulting from the use of marginal notching, are avoided.

As will be apparent from the card shown in FIG. 8, each locating hole or aperture is offset vertically of the card from the corresponding printed matter. This relationship of the apertures and printed matter results from the vertical off-setting of the punch and locating elements of the machine from the printing elements thereof in order to avoid interference with the inking ribbon. In order to reduce the over-all height of the machine, it is preferred that the card 18 be separated on each side into two portions, wtih the portion numbered "1" shown in FIG. 8 being first utilized. After full use of this portion of the card, the card may be inverted and the second portion numbered "2" may then be utilized in the same manner. Further, in the interest of economy, the reverse side of the card may be similarly separated into two portions which are separately usable. In order to permit the utilization of both sides of the card, the sensing finger 58 and punching element 116 are offset laterally of the longitudinal center line of the card receiving aperture 16 so as to provide a corresponding offset of the locating openings in the card from the card's longitudinal center line, and as will be further apparent from FIG. 8 the stop member 64 is so positioned relative to the punch that all of the apertures in each column thereof are on the same side of the lateral center line of the card.

It is believed that it will be apparent from the foregoing that there has been provided a novel and improved means for locating a record card in a machine of the class described as well as for actuating the punching and printing portions of the machine. The provision of locating openings in the card whereby the openings are spaced from the periphery of the card rather than at the edge thereof as in previous devices together with the associated complementally shaped sensing finger 58 assures accurate alignment of the card within the machine while at the same time contributes to a simplified arrangement for actuating the punching and printing elements of the machine.

While the invention has been described in terms of the specific preferred embodiment shown in the accompanying drawings, it is to be understood that the foregoing description, as well as the accompanying drawings, are to be taken only in an illustrative sense and that various alterations and modifications may be made without departing from the invention. It is, therefore, to be understood that the invention is to be limited only by the appended claims, which shall include within their scope all structure which logically falls within the language of these claims.

We claim:

1. In a card printing machine of the class described and having a card receivable slot for guiding a record card into the machine; punch means including a punch element to provide an aperture in a record card received in said slot, said punch element being disposed intermediate and spaced from the center line and a side bordering edge portion of said slot so as to provide card apertures spaced from the edges of the card, a sensing member for accurately aligning a card received in said slot and for effecting actuation of said punch means in response to movement of the card into the machine, said sensing member having a card engageable portion cross sectionally generally corresponding to and constructed to be seated in an aperture previously punched by said punch means, said card engageable portion being spaced from said punch element in the direction of card inserting movement into the machine, the sensing member being mounted for movement in the direction of card inserting movement into the machine and being operatively connected to said punch means to effect actuation of the same in response to movement of the sensing member in said direction of card inserting movement into the machine, and means for moving said sensing member in said direction of card inserting movement when there is no previously punched aperture alignable with said card engageable portion including a card engageable member separate from said card engageable portion and extending across path of insertion of the leading end of a card into the machine, said card engageable member being mounted for movement with the sensing member and being spaced from said punch element in the direction of card inserting movement.

2. In a card printing machine of the class described having a slot for the insertion of a record card or the like into the machine, a punching element mounted for movement toward and away from the general plane of said slot and being spaced from and between the side edges of said slot, a sensing member mounted for movement generally parallel to said general plane and in the direction of card inserting movement into the machine, said sensing member having a tapered card engageable portion cross sectionally generally corresponding to said punching element and engageable in a card aperture previously punched by said punching element as a card is being inserted into the machine to accurately align the card in the machine and form a driving connection between the card and sensing member, said card engageable portion of the sensing member being spaced from the punching element in the direction of card inserting movement into the machine being aligned with the punching element laterally of said slot, and means operatively connecting the punching element and sensing member to effect movement of the punching element toward said general plane in response to movement of the sensing member by a card in said direction of card inserting movement, and card engageable means movable with the sensing member to effect actuation of the punching element when there is no previously punched aperture in a card engageable by said sensing member.

3. In a card printing machine of the class described and having a card receivable slot for the insertion of a record card or the like into the machine, a punching element spaced intermediate and laterally from the side edges of the card receivable slot and mounted for movement toward and away from the general plane of the card receivable slot for providing an aperture in a card received in said slot, a feeler lever extending generally in the direction of card inserting movement into the machine and being mounted on a fixed pivot for movement toward and away from said general plane, said feeler lever being engageable with the leading end of a card during insertion of the card into the machine to effect pivotal movement of said feeler member in one direction, a sensing lever extending generally parallel to said direction of card inserting movement, means mounting one end of the sensing lever for pivotal movement about an axis parallel to the pivotal axis of the feeler lever and for movement of the sensing lever in said direction of card inserting movement, a spring connected at its opposite ends to the feeler and sensing levers respectively biasing the sensing lever in a direction opposite said direction of card inserting movement and urging the sensing lever away from said general plane and urging said feeler lever in a direction opposite said one direction, a resilient drive between said levers providing movement of said sensing lever toward said general plane in response to movement of said feeler lever in said one direction, said sensing lever having means complementally engageable in a card aperture previously provided by said punching element to accurately align a card in the machine and to provide a driving connection between the card and sensing lever, and means responsive to movement of the sensing lever in said direction of card inserting movement to effect movement of the punch element toward said general plane.

4. In a card printing machine of the class described and having a generally vertical card receivable slot for the insertion of a record card or the like into the machine, a punching element spaced intermediate and laterally from the centerline and a side edge of the card receivable slot and mounted for movement toward and away from the general plane of the card receivable slot for providing an aperture in a card received in said slot, a generally vertically extending feeler lever pivotally mounted on a fixed pivot for movement toward and away from said general plane, the feeler lever having a surface engageable with the leading end of a card during insertion of the card in the machine to cam said feeler lever in one direction, a second lever pivotally mounted at one end on a fixed pivot for movement in a plane parallel to the plane of movement of the feeler lever, a generally vertically extending sensing lever pivotally mounted at one end on said second lever for movement relative to said second lever in the plane of movement of said second lever, means connected between the feeler and sensing levers yieldably supporting the other end of said second lever on the feeler lever and urging said sensing lever away from said general plane, a resilient drive between the feeler and sensing levers to provide pivotal movement of the sensing lever toward said general plane in response to movement of the feeler lever in said one direction, said sensing lever having a card engageable portion spaced vertically above said punching element in alignment therewith laterally of said slot, said card engageable portion having a cross sectional configuration generally corresponding to that of said punching element and being engageable in a card aperture previously provided by said punching element to accurately align a card in the machine and to provide a driving connection between the card and sensing lever so that with said card engageable portion engaged in an aperture and upon downward movement of the card there will be a corresponding downward movement of the sensing lever with a corresponding movement of said second lever, electrical drive means connected to said punching element for moving the same toward said general plane, switch means for controlling said drive means, and means carried by said second lever for actuating said switch means to effect movement of the punching element toward said general plane in response to card effected downward movement of the sensing lever.

5. In a card printing machine of the class described and having a generally vertical card receivable slot for the insertion of a record card or the like into the machine, a punching element spaced intermediate and laterally from the centerline and a side edge of the card receivable slot and mounted for movement toward and away from the general plane of the card receivable slot for providing an aperture in a card received in said slot, a generally vertically extending feeler lever pivotally mounted on a fixed pivot for movement toward and away from said general plane, the feeler lever having a surface engageable with the leading end of a card during insertion of the card in the machine to cam said feeler lever in one direction, a generally horizontally extending second lever pivotally mounted at one end on a fixed pivot for movement in a plane parallel to the plane of movement of the feeler lever, a generally vertically extending sensing lever pivotally mounted at one end on said second lever for movement relative to said second lever in the plane of movement of the feeler lever, a spring connected between the feeler and sensing levers to yieldably support the other end of said second lever on the feeler lever and to urge the sensing lever away from said general plane, a leaf spring on one of the feeler and sensing levers, an adjustable stop on the other of said feeler and sensing levers engageable with the leaf spring to provide movement of the sensing lever toward said general plane in response to movement of said feeler lever in said one direction, said sensing lever having a tapered card engageable portion spaced vertically above said punching element and in alignment therewith laterally of said slot, and said card engageable portion having a cross sectional configuration generally corresponding to that of said punching element and being engageable in a card aperture previously provided by said punching element to accurately align a card in the machine and to provide a driving connection between the card and sensing lever so that upon downward movement of the card there will be a corresponding downward movement of the sensing lever with a corresponding pivotal movement of said second lever, electrical drive means connected to said punching element for moving the same toward said general plane, means urging the punching element away from said general plane, switch means for controlling said drive means, and means for actuating said switch means to effect movement of said punching element toward said general plane in response to card effected downward movement of said sensing lever.

6. In a card printing machine of the class described and having a slot for inserting a record card or the like into the machine, a punch movable toward and away from the general plane of said slot, a member engageable with a card during insertion of the same into the machine to provide a driving connection between the card and said member, means mounting said member for movement with a card in the direction of card inserting movement into the machine including a support for said member mounted for movement with said member, electrical drive means connected to the punch for moving the punch toward said general plane, a control switch for said drive means including a pivoted spring biased switch arm, a movably mounted switch actuating member on said support having a shoulder engageable with said switch arm for actuation of the switch to energize said drive means in response to movement of the first mentioned member in said direction of card inserting movement, means biasing said switch actuating member toward engagement with said switch arm, and means mounted for movement with the punch engageable with said switch actuating member to disengage said shoulder and switch arm so as to deenergize said drive means during movement of the punch toward said general plane.

7. In a card printing machine of the class described and having a slot for inserting a record card or the like into the machine, a punch movable toward and away from the general plane of said slot, a member engageable with a card during insertion of the same into the machine to provide a driving connection between the card and said member, means mounting said member for movement with a card in the direction of card inserting movement into the machine including a support for said member mounted for movement with said member, a pivoted lever on said support extending generally in the direction of movement of the support and having an aperture, electrical drive means connected to the punch for moving the punch toward said general plane, a control switch for said drive means including a pivoted spring biased switch arm having a free end received in said aperture in engagement with a bordering edge portion of said aperture to provide for movement of the switch arm in a switch actuating direction in response to movement of said support in a direction corresponding to card effected movement of said member, means biasing said lever toward engagement with said switch arm, and means mounted for movement with the punch engageable with said lever to disengage the switch arm from said bordering edge portion of said aperture so as to deenergize said drive means during movement of the punch toward said general plane.

8. In a card printing machine of the class described having a slot for the insertion of a record card or the like into the machine, a punch element mounted for movement toward and away from the general plane of said slot and spaced laterally from and between the side edges of said slot; means to provide indicia on a card inserted in the machine respectively corresponding to each aperture provided by the punch element, a sensing member including a card engageable portion aligned with the punch element laterally of said slot and spaced from said punch element in the direction opposite that of card inserting movement into the machine, said card engageable portion being generally complementary to said punch element and being engageable in a card aperture previously formed by said punch element as a card is being inserted into the machine to accurately align the card in the machine and to provide a driving connection between the card and sensing member, the sensing member being mounted for movement in a direction of card inserting movement and being operatively connected to said punch element and the indicia providing means to effect actuation of the same in response to movement of the sensing member in said card inserting direction of movement, and a card stop mounted for movement with said sensing member in said direction of card inserting movement and spaced from said punch element in said direction of card inserting movement, said card stop being disposed in registry with said general plane of the slot and being engageable by a card inserted into the machine to move the sensing member in a punch actuating direction when there is no previously punched aperture in the card registrable with said card engageable portion.

9. In a card printing machine of the class described and having a card receivable slot for the insertion of a record card or the like into the machine, a punching element spaced from and between the centerline and a side of the card receivable slot and mounted for movement toward and away from the general plane of the card receivable slot for providing an aperture in a card received in said slot, a sensing member mounted for movement both generally parallel to said general plane in the direction of card inserting movement and toward and away from said general plane, means resiliently supporting said sensing member and urging the same in the direction opposite the direction of movement of a card into the machine, said sensing member having a tapered card engageable portion spaced from said punching element in the direction opposite that of card inserting movement into the machine and aligned with the punching element laterally of said slot, said card engageable portion being normally spaced from said general plane and having a cross sectional configuration generally corresponding to that of said punching element and being complementally engageable in a card aperture previously provided by said punching element to accurately align a card in the machine and to provide a driving connection between the card and sensing member so that upon further movement of the card in said direction of card inserting movement a corresponding movement of the sensing member will occur, means responsive to insertion of a card into said slot for urging the sensing member toward said general plane, means operatively connecting the sensing member and punching element to effect movement of the punching element toward said general plane in response to card effected movement of said sensing member in said direction of card inserting movement, and a card stop mounted for movement with said sensing member and disposed at least in part in said general plane and on the other side of said punching element from said card aperture engageable portion of the sensing member, the card stop being engageable by the inner end of a card inserted into the machine when there is no previously provided aperture in the card which is laterally aligned with said card aperture engageable portion to limit movement of the card into the machine and to provide for movement of the sensing member in said direction of card inserting movement in response to further insertion of the card into the machine, said stop being spaced from said punching element a distance no greater than one half the length of a card intended for use with the machine.

References Cited in the file of this patent

UNITED STATES PATENTS

| | | |
|---|---|---|
| 1,881,090 | Moulton | Oct. 4, 1932 |
| 1,963,812 | Vandusen | June 19, 1934 |
| 2,023,130 | Friden | Dec. 3, 1935 |
| 2,233,158 | Connor | Feb. 25, 1941 |
| 2,281,577 | Haynes | May 5, 1942 |
| 2,283,804 | Grant | May 19, 1942 |
| 2,306,694 | Grant | Dec. 29, 1942 |
| 2,427,418 | Rast | Sept. 16, 1947 |